Figure 2:
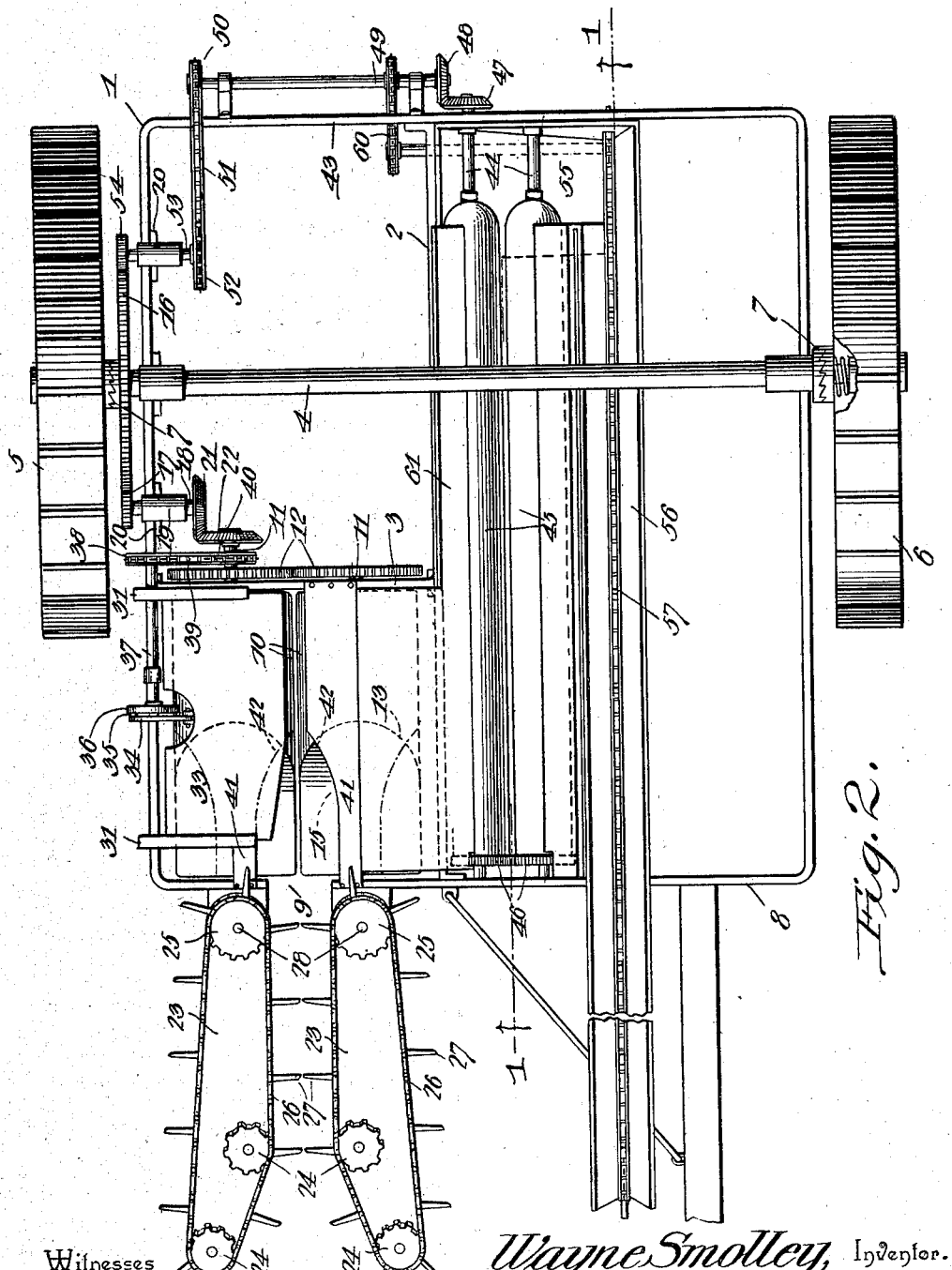

No. 731,717. PATENTED JUNE 23, 1903.
W. SMOLLEY.
CORN HARVESTER.
APPLICATION FILED FEB. 19, 1903.
NO MODEL. 2 SHEETS—SHEET 1.
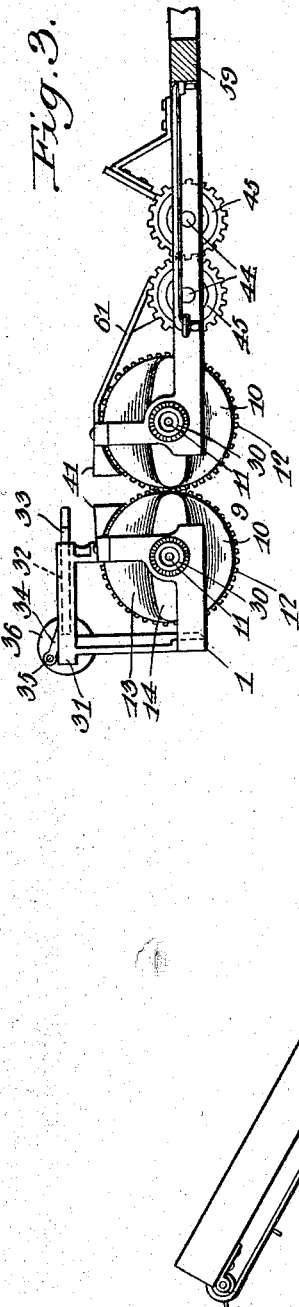
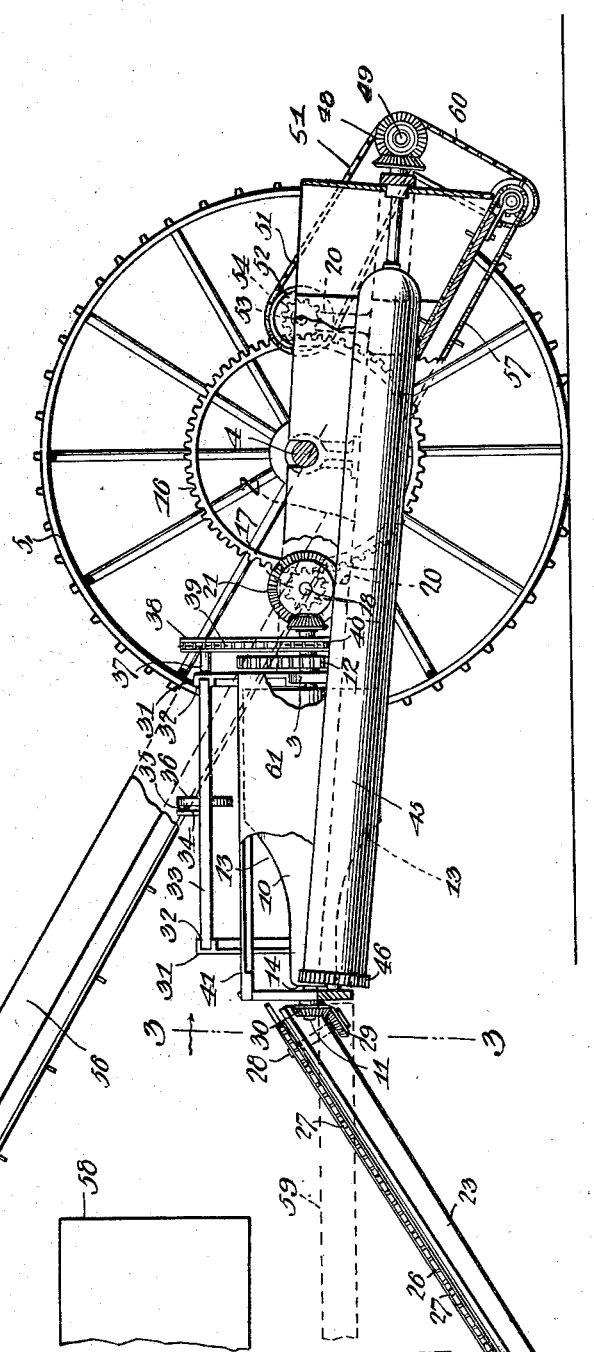
Witnesses
Wayne Smolley, Inventor.
Attorneys No. 731,717. PATENTED JUNE 23, 1903.
W. SMOLLEY.
CORN HARVESTER.
APPLICATION FILED FEB. 19, 1903.
NO MODEL. 2 SHEETS—SHEET 2.

Witnesses Wayne Smolley, Inventor.
by C. A. Snow & Co.
Attorneys

No. 731,717. Patented June 23, 1903.

UNITED STATES PATENT OFFICE.

WAYNE SMOLLEY, OF BROOKVILLE, INDIANA, ASSIGNOR OF ONE-HALF TO GIDEON E. VANNESS, OF BATH, INDIANA.

CORN-HARVESTER.

SPECIFICATION forming part of Letters Patent No. 731,717, dated June 23, 1903.

Application filed February 19, 1903. Serial No. 144,126. (No model.)

*To all whom it may concern:*

Be it known that I, WAYNE SMOLLEY, a citizen of the United States, residing at Brookville, in the county of Franklin and State of Indiana, have invented a new and useful Corn-Harvester, of which the following is a specification.

This invention relates to corn-harvesters of that class in which the ears are gathered from the stalks while the latter are standing in the field and which are also provided with devices for removing the husks from the ears and with means for elevating the husked ears into a wagon which in this instance is driven in front of my improved device which in practice is connected with said wagon, so that the wagon and corn-harvester may be operated by a single team.

My present invention has for its special object to provide improved means for removing the ears from the stalks. Heretofore "snapping-rollers" have been employed for this purpose, such snapping-rollers consisting of pairs of rollers coacting upon the corn-stalks to squeeze, press, or snap the ears from the stalks, thereby quite frequently injuring the corn by partially shelling the same or by breaking the ears, thus involving more or less loss. By my present invention the removal of the ear from the stalk is effected by a rapidly-reciprocating slide, which while the butt of the ear engages breaking-bars above the so-called "snapping-rollers" serves to push or break the ear off from the stalk in a more satisfactory manner than by the means hitherto employed.

With these and other ends in view my invention consists in certain improvements in the construction, arrangement, and combination of the parts constituting my said corn-harvesting device, which will be hereinafter fully described, and particularly pointed out in the claims.

In the accompanying drawings, Figure 1 is a sectional elevation of a corn-harvesting machine constructed in accordance with the principles of my invention. Fig. 2 is a top plan view of the same. Fig. 3 is a sectional detail view taken on the line 3 3 in Fig. 1.

Corresponding parts in the several figures are indicated by similar numerals of reference.

My improved corn-harvester comprises in its construction a main frame 1, which is preferably rectangular in shape and which is provided with a suitably-disposed longitudinal brace 2, which is connected by a cross-brace 3 with one of the side bars of the frame 1. The frame is supported upon an axle 4, having supporting-wheels 5 and 6, both of which are connected with the axle by clutch devices, (conventionally indicated at 7.) The front side 8 of the main frame is provided with a gap or opening 9 in front of the transverse brace 3, and on each side of said gap is disposed a roller 10. The shafts 11 of said rollers 10 have bearings in the cross-brace 3 and in the front side 8 of the frame, as will be seen, and said shafts are provided near their rear ends with intermeshing spur-gears 12. The rollers 10, which I prefer to term the "snapping-rollers," although, as will be presently seen, they do not actually contribute to remove the ears by snapping them from the stalks, are for the greater part of their lengths cylindrical in shape, their forward ends being gradually reduced, as shown at 13, so as to form elliptical front ends 14, the greater diameters of which are equal to the diameters of the rollers and are so disposed that during the rotation of the rollers they will be alternately disposed in alinement and parallel to each other. Thus when the said rollers are disposed with the greater diameters of their forward ends in alinement with each other the said rollers will be nearly in contact with each other throughout their lengths, while when in the position indicated, for instance, in dotted lines in Fig. 2 there will be a gap or opening 15 between the front ends of said rollers, the width of which will be about equal to that of the gap 9 in the front side of the frame with which it is in alinement.

The rollers 10 are driven from the axle of the machine, which is provided with a gear-wheel 16, meshing with a pinion 17 upon a shaft 18, bearings for which are provided in a boxing 19, secured by a brace 20 upon one side of the frame of the machine. The inner end of the shaft 18 carries a bevel-gear 21, meshing with a bevel-pinion 22 upon the rear end of one of the roller-shafts 11. It will be observed that the gear members 16, 17, 21, and 22 form speed-multiplying elements, whereby the rollers 10 are driven at the desired rate of speed.

Suitably attached to the front side of the frame are gatherers of ordinary construction, comprising the downwardly-extending arms 23, supporting sprocket-wheels 24 and 25, carrying endless chains 26, which are provided in the usual manner with outwardly-extending fingers 27, adapted to engage the stalks and to carry them in a rearward direction between the gathering-arms, which latter diverge at their front ends in the usual manner, so as to facilitate the entrance between them of the said stalks. The gathering-arms 23 have their points of attachment on opposite sides of the gap 9 in the frame, and the shafts 28 of the uppermost sprocket-wheels 25 are extended downward and provided with bevel-gears 29, intermeshing with bevel-gears 30 upon the front ends of the shafts 11 of the snapping-rollers, from which the said endless carriers are thus driven. It is obvious, however, that any other suitable means may be employed for transmitting motion to these endless carriers without departing from the scope of my invention.

Brackets 31, rising from and suitably attached to the frame of the machine, are provided near their upper ends with grooves 32, affording bearings for a transversely-reciprocating slide 33, which is disposed at a short distance above the outer snapping-roller, meaning the one which is disposed most closely to the outer side of the frame. This slide 33 is connected, by means of a pitman 34, with a wrist-pin 35 upon a disk 36, which is mounted upon a shaft 37, disposed in suitable bearings parallel to the roller-shafts 11 and having at its rear end a sprocket-wheel 38, which is connected, by means of a chain 39, with a sprocket-wheel 40 upon the roller-shaft 11, from which a reciprocatory motion is thus communicated to the slide 33. The location of the latter is such that it will reciprocate across the narrow space between the rollers 10 at a short distance above said rollers.

41 41 designate guards suitably attached to the frame above the rollers, the under sides of said guards being curved or concaved to freely accommodate the adjacent sides of said rollers and to some extent form housings for the latter. The front ends of the guards 41, which constitute what I term the "breaking-bars," are recessed, as shown at 42, so as to facilitate the admission of the cornstalks.

Suitably journaled in the front and rear sides 8 and 43 of the frame are the shafts 44 of a pair of husking-rollers 45, which are provided with intermeshing spur-gears 46. One of said shafts 44 is also provided with a bevel-gear 47, intermeshing with a bevel-gear 48 upon a suitably-supported shaft 49, carrying at its opposite end a spur-wheel 50, which is connected by a chain 51 with a spur-wheel 52 upon a shaft 53, having at its opposite end a pinion 54, meshing with the spur-wheel 16 upon the axle, from which motion is thus transmitted to the husking-rollers. The latter, which may be of any suitable construction, terminate short of the rear ends of the shafts 44, upon which they are mounted, in order to permit the ears which have been deprived of their husks to drop into a trough 55, which is connected by a suitably-constructed elevator 56, the endless carrier of which, 57, serves to carry the corn upwardly and forwardly over the frame of the machine and to finally deposit the same in the box (conventionally indicated at 58) of a wagon which is driven in front of the machine, to the hind axle or some other suitable part of which the tongue 59 of my improved machine is suitably connected, so that as the wagon progresses over the field the machine will follow in its wake, strip the ears from the stalks, and deposit them in the wagon-box. The endless carrier of the elevator may be driven by intermediate gearing, (indicated at 60;) but I desire it to be understood that the gearing for conveying motion to said carrier may be disposed in any suitable and convenient manner. A trough 61 is disposed adjacent to the husking-rollers, one side of said trough being extended over the inner roller 10, so as to form a partial housing for the latter.

From the foregoing description, taken in connection with the drawings hereto annexed, the operation and advantages of my invention will be readily understood by those skilled in the art to which it appertains. When the machine progresses over the field, the stands of corn entering between the gathering-arms will be conveyed by the endless carrier 26 in a rearward direction to the gap 9 in the front side of the frame, where the stalks enter between the reduced ends of the rollers 10, which rotate so rapidly as to present no obstacle to the admission of the stalks. The rotation of the rollers 10, which forcibly engage the stalks, will rapidly pull the latter in a downward direction, causing them to bend or buckle under the machine and to quickly present the ears to the rapidly-reciprocating slide 33, the action of which is to push and positively break the ear from the stalk and to throw it into the trough 61, in the bottom of which the husking-rollers are disposed. The breaking-bars 41 coöperate with the slide 33 to effect the desired result, and it will be seen that it is quite impossible for an ear of corn to escape the combined action of the said elements 41 and 33. The husking-rollers, as described, are tilted or inclined downwardly, and they operate in the usual manner to remove the husks from the ears, the former passing between the rollers to the ground, while the latter slide downwardly to the trough 55, thence to the elevator, whereby they are conveyed to the wagon-box.

I have in the foregoing described a simple and preferred construction of my invention; but I desire it to be understood that I do not limit myself with regard to the structural details herein shown and described. I also desire it to be understood that the principles of my invention may with equal efficiency be applied to corn-harvesters adapted to operate simultaneously upon two or more rows of corn, as will be readily understood. I reserve to myself the right to any changes, modifications, and alterations which may be resorted to without departing from the spirit and scope of my invention or sacrificing the utility of the same. Thus, for instance, I would have it distinctly understood that the dimensions and relative proportions of the parts of the machine, and especially of the snapping and husking rollers, may be widely varied and still be within the scope of my invention. Again, it should be understood that the various operating parts of the machine may by properly proportioning the gearing be driven at any desired rate of speed which by practical test eventually proves itself to be most desirable.

Having thus described the invention, I claim—

1. In a machine of the class described, stalk-engaging rollers reduced to form elliptical front ends.

2. In a machine of the class described, stalk-engaging rollers reduced to form elliptical front ends, the greater diameters of which are equal to the diameters of said rollers.

3. In a machine of the class described, stalk-engaging rollers reduced to form elliptical front ends, and stalk-engaging bars disposed above and adjacent to said rollers and having recessed front ends.

4. In a machine of the class described, stalk-engaging rollers reduced to form elliptical front ends, in combination with stalk-engaging bars disposed above and adjacent to said rollers, and a transversely-reciprocating slide.

5. In a machine of the cass described, stalk-engaging rollers reduced to form elliptical front ends, in combination with stalk-engaging bars disposed above and adjacent to said rollers and having recessed front ends, said bars being disposed sufficiently close together to prevent the passage of ears therebetween, and transversely-operating means for striking and removing the ears intercepted by said bars.

In testimony that I claim the foregoing as my own I have hereto affixed my signature in the presence of two witnesses.

WAYNE SMOLLEY.

Witnesses:
GIDEON E. VANNESS,
A. T. SLOANE.